United States Patent [19]

Kawamata

[11] 4,091,168
[45] May 23, 1978

[54] LEADER FOR MAGNETIC RECORDING TAPE HAVING COEXTENSIVE FLEXIBLE LAYERS WITH METAL LAMINATED THEREBETWEEN

[75] Inventor: Katsuyoshi Kawamata, Shiogama, Japan

[73] Assignee: Sony Corporation, Tokyo, Japan

[21] Appl. No.: 675,955

[22] Filed: Apr. 12, 1976

[30] Foreign Application Priority Data

Apr. 14, 1975 Japan .................. 50-50287[U]

[51] Int. Cl.² .............. B32B 27/04; B32B 15/08
[52] U.S. Cl. ..................... 428/416; 428/57;
428/192; 428/418; 428/458; 428/474; 428/480;
428/483; 352/235; 96/78; 360/85; 274/11 E;
179/100.12 R
[58] Field of Search .......... 428/57, 416, 458, 414,
428/192, 418, 474, 480, 483; 360/85; 96/78;
352/235

[56] References Cited

U.S. PATENT DOCUMENTS

| 1,972,424 | 9/1934 | Mediger | 96/78 |
| 2,978,372 | 4/1961 | Bergstedt et al. | 428/57 |
| 3,598,926 | 8/1971 | Umeda | 360/85 |
| 3,900,662 | 8/1975 | Yuan | 428/458 X |
| 3,914,502 | 10/1975 | Hayashi et al. | 428/458 X |

FOREIGN PATENT DOCUMENTS 700,988  12/1964  Canada ................ 428/458

Primary Examiner—P. C. Ives
Attorney, Agent, or Firm—Lewis H. Eslinger; Alvin Sinderbrand

[57] ABSTRACT

A tape leader, for example, for magnetic recording tape, is comprised of an electrically conductive metal film of aluminum, copper or the like, which is bonded or laminated between two flexible synthetic resin films, for example, of polyester resin, so as to be protected from damage or corrosion by the flexible resin films. Such tape leader may be detected by a resonance sensor or the like.

5 Claims, 5 Drawing Figures

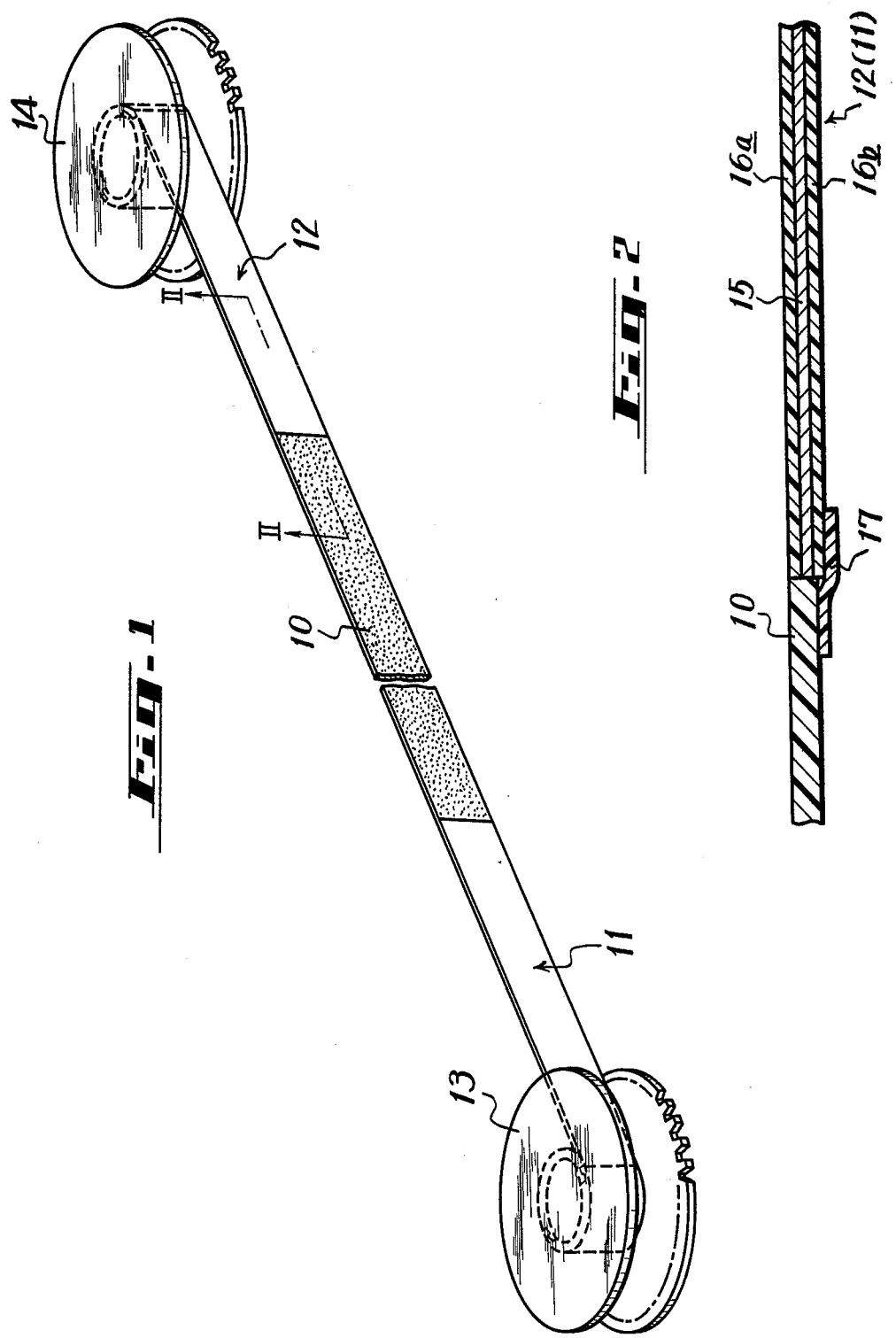

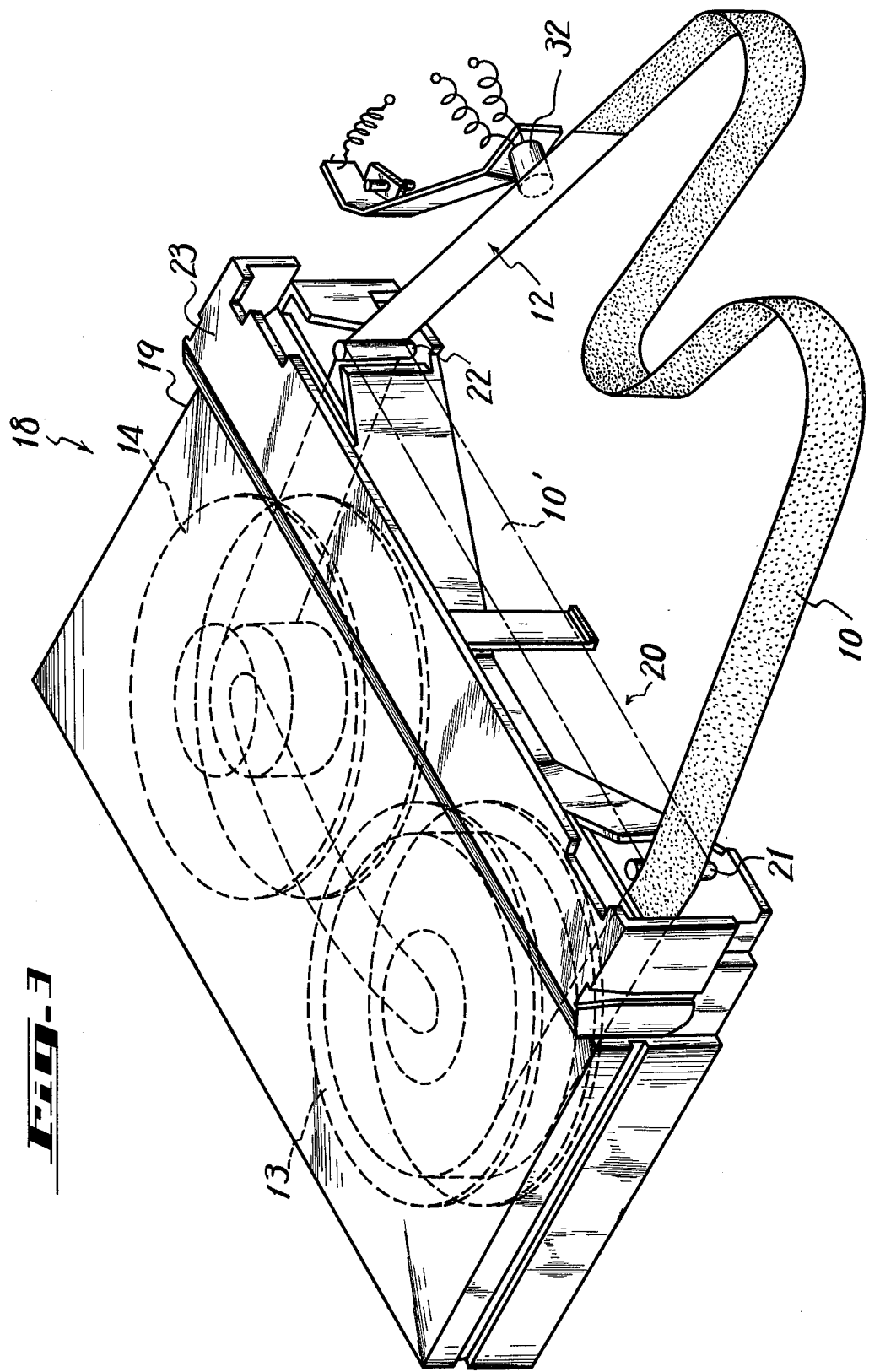

LEADER FOR MAGNETIC RECORDING TAPE HAVING COEXTENSIVE FLEXIBLE LAYERS WITH METAL LAMINATED THEREBETWEEN

BACKGROUND OF THE INVENTION

1. Field of the Invention

This invention relates generally to a leader for a magnetic or other recording tape, and more particularly is directed to an improved leader for a magnetic or other recording tape which, when secured to one or both of the ends of the latter, may be detected to indicate the presence of the adjacent end of the recording tape in an audio or video recording and/or reproducing apparatus or the like.

2. Description of the Prior Art

In tape cassettes for use in audio or video recording and/or reproducing apparatus, it is known to provide leaders connected between the opposite ends of a magnetic recording tape and the hubs of the supply and takeup reels on which the tape is wound so that one or the other of the tape leaders can be detected to indicate the full unwinding of the tape from a respective reel during a recording, reproducing, fast-forward or rewind operation of the apparatus in which the tape cassette is employed. One existing type of tape leader is formed of a flexible base of polyester film having a thin layer or film of aluminum or copper provided on one surface of the base, as by vapor depositing or plating the metal on the base or by adhering or bonding a metal film to the base. A tape leader of the foregoing type can be conveniently detected by a resonance sensor including an oscillator having a L-C resonance circuit, a detector for detecting the output of the oscillator, and a warning and/or shut-off mechanism which responds to detection of a change in the frequency of the oscillator output or a halt in such output. At least the inductance element of the L-C resonance circuit is included in a sensor which is disposed adjacent the path of the recording tape so that, when the tape leader with an aluminum or copper film or coating thereon is disposed adjacent the sensor, the inductance or sharpness of the resonance circuit is changed or decreased and, accordingly, the oscillating frequency is changed or the oscillation is halted. For example, in an existing video tape recorder (VTR), when the tape leader is detected, as aforesaid, an automatic shut-off mechanism is actuated or energized to halt the recording, reproducing, fast-forward or rewinding operation and to eject the tape cassette from the VTR. Further, in such VTR, detection of the tape leader causes energizing of a warning lamp and/or buzzer or other audible signal.

However, the existing tape leader, as described above, has a relatively poor ability to return to its original flat condition after being bent. Therefore, after frequent use of the recording tape having such leader or leaders, the latter may become crumpled or snap, or cracks or fissures may develop in the conductive metal film or coating thereof. The foregoing problems are especially encountered when the recording tape with a leader or leaders is made to follow a sinuous path about numerous tape guides in the tape cassette and/or in the recording and/or reproducing apparatus with which the cassette is used. When a tape leader is damaged, as aforesaid, it is difficult to replace the same, particularly if the associated recording tape and leaders are incorporated in a tape cassette. Furthermore, when the tape leader or leaders become crumpled, the crumpled condition of the leader material may injure or cause uneven winding of the magnetic or other recording tape about the crumpled leader on the associated supply or takeup reel with the result that dropout of the video or other recorded signals may be experienced.

Moreover, in the above described existing tape leader, the aluminum or copper film is corroded or oxidized when the recording tape is exposed to a humid atmosphere for an extended length of time. Such corrosion or oxidation of the aluminum or copper film of the tape leader changes its electric conductivity, with the result that the sensing of the tape-end is undesirably influenced, that is, the sensor can no longer reliably detect the tape leader when the latter is adjacent thereto.

OBJECTS AND SUMMARY OF THE INVENTION

Accordingly, it is an object of this invention to provide an improved tape leader which can be sensed or detected, as aforesaid, but which avoids the above described disadvantages of the existing tape leader.

More specifically, it is an object of this invention to provide a tape leader which can be sensed or detected, as aforesaid, but which has improved flexibility and stability so as to avoid crumpling of the tape leader even when it is repeatedly moved in a sinuous path about numerous tape guides in a tape cassette and/or in a recording and/or reproducing apparatus with which the cassette is employed.

Another object is to provide a tape leader which includes an electrically conductive metal film so that the tape leader may be sensed or detected as described above, but in which such metal film is protected from corrosion or oxidation, even when exposed to a humid atmosphere, so as to avoid changes in the electrical conductivity of the metal film.

In accordance with an aspect of this invention, a tape leader, for example, for magnetic recording tape, comprises an electrically conductive metal film of aluminum, copper or the like, which is bonded or laminated between two flexible synthetic resin films, for example, of a polyester, polyamide, polyimide or acetate resin. Since the conductive metal film is bonded or laminated between the synthetic resin films, the latter protect the metal film from corrosion or oxidation even when the associated recording tape is used in a humid atmosphere. Further, the flexible synthetic resin films between which the conductive metal film is bonded or laminated ensure that the resulting tape leader will have the requisite flexibility and stability to resist crumpling even when the tape leader and associated recording tape repeatedly move in a sinuous path about numerous tape guides provided in a tape cassette or in a recording and/or reproducing apparatus with which the tape cassette is employed.

The above, and other objects, features and advantages of the invention, will be apparent in the following detailed description of an illustrative embodiment of the invention which is to be read in connection with the accompanying drawings.

BRIEF DESCRIPTION OF THE DRAWINGS

FIG. 1 is a perspective view of a length of recording tape provided with leaders according to an embodiment of this invention by which the ends of the recording tape are respectively connected to supply and takeup reels;

FIG. 2 is an enlarged, fragmentary sectional view taken along the line II—II on FIG. 1, and showing details of the tape leader according to this invention;

FIG. 3 is a perspective view of a tape cassette in which a recording tape provided with leaders according to this invention may be housed, with the recording tape shown withdrawn from the cassette housing so as to move in a path adjacent a sensor for detecting one or the other of the tape leaders;

DESCRIPTION OF A PREFERRED EMBODIMENT

Figure 4:
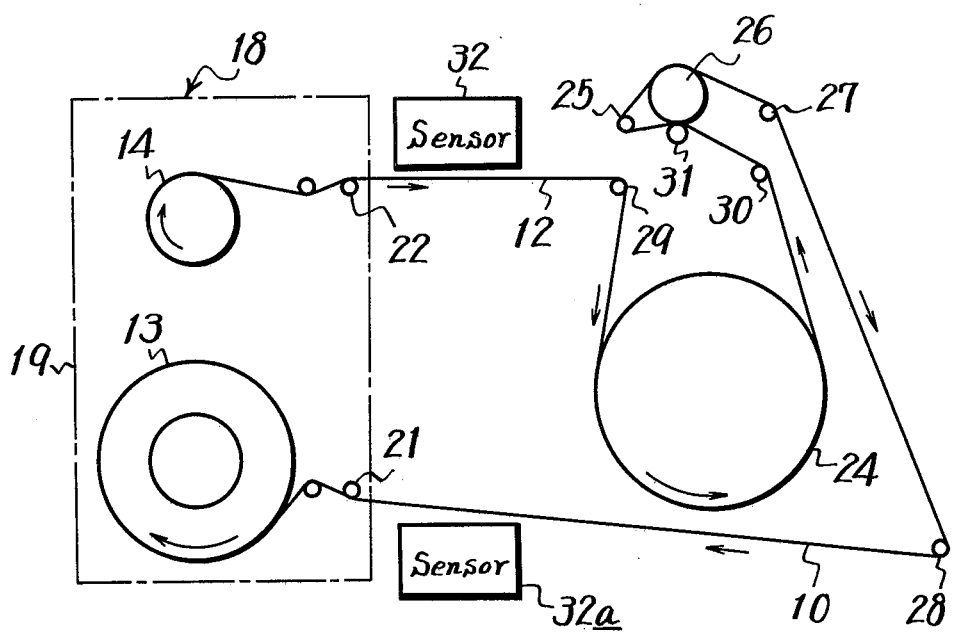
FIG. 4 is a diagrammatic view showing the tape cassette of FIG. 3 associated with a video recording and/or reproducing apparatus which includes sensors for detecting the tape leaders.

Referring to the drawings in detail, and initially to FIG. 1 thereof, a recording tape 10, for example, a conventional magnetic recording tape, is there shown to have tape leaders 11 and 12 extending from its opposite ends and being respectively secured to the hubs of takeup and supply reels 13 and 14.

In accordance with the present invention, and as particularly shown on FIG. 2, each of the tape leaders 11 and 12 comprises an electrically conductive metal film 15, for example, of aluminum or copper foil or film, which is bonded or laminated between two flexible, synthetic resin films 16a and 16b formed, for example, of a polyester, polyamide, polyimide or acetate resin. By way of example, the electrically conductive metal film 15 may have a thickness of about 9 microns, while each of the flexible synthetic resin films 16a and 16b has a thickness of about 12 microns.

In producing the tape leaders 11 and 12, a thermosetting epoxy resin may be applied to surfaces of flexible synthetic resin films, whereupon, a film or foil of the electrically conductive metal is sandwiched between the epoxy resin coated surfaces of the flexible synthetic resin films. The resulting sandwich is then passed between suitable pressure rollers and heated so as to provide a lamination of the flexible synthetic resin films with the conductive metal film therebetween. Finally, such lamination is passed through a slitter by which the desired tape leaders are cut from the lamination.

As is shown on FIG. 2, the tape leaders 11 and 12 according to this invention may be connected to the respective ends of the magnetic recording tape 10 by means of conventional splicing tape 17.

Referring now to FIG. 3, it will be seen that the magnetic recording tape 10 having tape leaders 11 and 12 connecting the opposite ends thereof to the hubs of takeup and supply reels 13 and 14 may be conveniently incorporated in a tape cassette 18 having a substantially rectangular cassette housing 19 in which the reels 13 and 14 are rotatably disposed in side-by-side relation. The housing 19 may, as shown, have an opening 20 extending along one of its long sides, with tape guide pins 21 and 22 being provided in housing 19 adjacent the opposite ends of opening 20 for guiding the tape 10 between reels 13 and 14 in a path indicated in broken lines at 10' and which extends along the open side of the cassette housing when the cassette is not in use. Further, the cassette 18 is shown to be provided with a lid 23 which is pivotally mounted on housing 19 so as to be movable between a closed position (not shown) in which the lid 23 covers and protects the magnetic recording tape in path or run 10' when the cassette 18 is not in use, and an opened position in which the opening 20 of housing 19 is exposed so that the tape in run or path 10' can be suitably engaged for withdrawal from the housing of the tape between reels 13 and 14, as shown in full lines on FIG. 3.

The tape cassette 18 as described above and containing a magnetic recording tape provided with tape leaders according to this invention is particularly suited for use in connection with a video signal recording and/or reproducing apparatus of the type shown schematically on FIG. 4. Such apparatus generally includes a tape guide drum 24 having one or more rotary magnetic heads (not shown) moved in a circular path coinciding with the circumferential surface of the drum for scanning record tracks extending obliquely across the magnetic recording tape 10 when the latter is wrapped in a helical path about at least a portion of the circumferential surface of guide drum 24, and a holder (not shown) for receiving and positioning the cassette 18 at a location spaced from guide drum 24. The recording and/or reproducing apparatus is conveniently provided with a tape loading device which may be of the type disclosed in detail in U.S. Pat. No. 3,821,805, issued June 28, 1974, and having a common assignee herewith. Such tape loading device, which forms no part of the present invention, is shown simply on FIG. 4 to include a tape engaging member 25, a pinch roller 26 and tape guide members 27,28 and 29 which, in an initial condition of the tape loading device, are engageable with the run of tape 10 extending between guide pins 21 and 22, as at 10' on FIG. 3. In the course of a tape loading operation, the tape engaging member 25, pinch roller 26 and tape guiding members 27,28 and 29 move to the positions shown on FIG. 4 and are effective to withdraw a loop of the tape 10 from the cassette housing 19 with one side of the tape loop extending from supply reel 14 and guide pin 22 being wrapped about a portion of the circumference of guide drum 24 and guided in respect to the latter by the guide member 29 and a fixed guide member 30, while the other side of the tape loop is held away from guide drum 24 by guide members 27 and 28 and directed to guide pin 21 and, from the latter, to takeup reel 13. Further, at the completion of the tape loading operation, pinch roller 26 is disposed, as shown, to press the magnetic recording tape against a rotated capstan 31 by which the tape is made to advance in the direction indicated by the arrows on FIG. 4 for a recording or reproducing operation of the apparatus. In the course of such recording or reproducing operation, the tape is unwound from supply reel 14 and rewound on takeup reel 13, and it is, of course, desirable that the recording or reproducing operation be terminated when the recording tape 10 has been fully unwound from supply reel 14. The recording and/or reproducing apparatus is further capable of a fast-forward operation in which the tape is rapidly unwound from supply reel 14 and wound on takeup reel 13, and of a rewind operation in which the tape is rapidly unwound from takeup reel 13 and returned to supply reel 14. It is also desirable that such fast-forward and rewind operations be terminated when the tape is fully unwound from the supply reel 14 or from the takeup reel 13, respectively. In order to indicate that the magnetic recording tape 10 is fully unwound from supply reel 14, as during a recording or reproducing operation or a fast-forward operation, the apparatus shown on FIG. 4 further includes a sensor 32 disposed adjacent the path of the tape between guide pin 22 and guide member 29, and which is operative to detect the presence of the tape leader 12 according to this invention in such portion of the tape path. A similar sensor 32a may be disposed adjacent the portion of the tape path between guide pin 21 and guide member 28 for detecting the presence in such portion of the tape path of the tape leader 11 according to this invention, as when the magnetic recording tape 10 is fully unwound from takeup reel 13 during a rewind operation of the apparatus.

Figure 5:
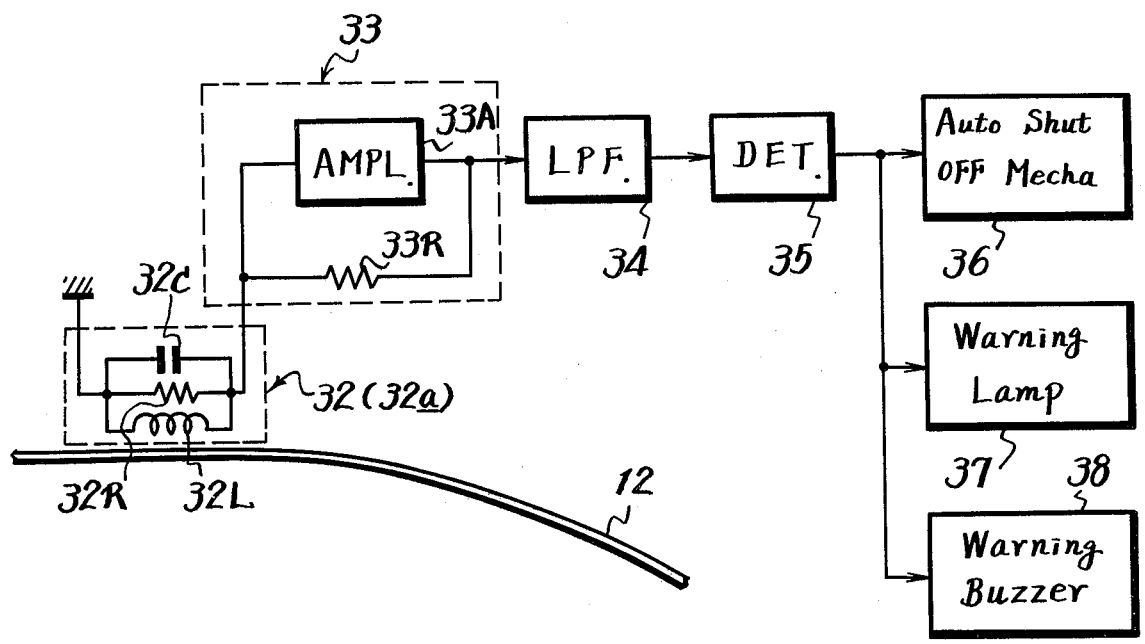
FIG. 5 is a diagrammatic view of a resonance sensor circuit that may be used for detecting a tape leader according to this invention.

As is shown particularly on FIG. 5, each of the sensors 32 and 32a for detecting the presence adjacent thereto of the tape leaders according to this invention may be constituted by a resonance circuit comprised of an inductance 32L, a capacitor 32C and a Q-damping resistor 32R in a parallel circuit connected with an oscillator 33 which, as shown, may comprise an amplifier 33A and a positive feedback resistor 33R. Under normal conditions, that is, so long as the tape leader 12 according to this invention is not disposed adjacent to sensor 32 so as to influence the inductance 32L by means of the electrically conductive metal film 15 of the leader, oscillator 33 oscillates with a predetermined frequency, for example, 200KHz. Such AC output from oscillator 33 is converted into a DC signal by a low pass filter 34 which may be simply constituted by a rectifying diode. The level of the DC signal from low pass filter 34 is detected by a level detector 35 which may, in turn, control an automatic shut-off mechanism 36 and-/or a warning or signal lamp 37 and an audible signal or warning buzzer 38. So long as detector 35 detects a predetermined DC level, that is, so long as a tape leader according to this invention is not adjacent to the respective sensor 32 or 32a, the automatic shut-off mechanism 36 and the warning lamp and buzzer 37 and 38 are maintained in their inoperative conditions. However, when the tape leader 11 or 12 is disposed adjacent the inductance 32L of the respective sensor 32a or 32 so as to indicate the full unwinding of the tape 10 from the reel 13 or 14, the sharpness Q of the resonance circuit constituting the sensor is sharply reduced so as to either halt the oscillation of oscillator 33 or to substantially increase the frequency thereof. In either event, the output from low pass filter 34 is reduced to zero with the result that detector 35 causes operation of automatic shut-off mechanism 36 and of the warning lamp and buzzer 37 and 38. Upon such operation of the automatic shut-off mechanism 36, the driving of the tape 10 by capstan 31 and the rotation of takeup reel 13 for winding the tape thereon during a recording or reproducing operation are halted. Similarly, during a fast-forward operation or a rewind operation, the detection of tape leader 12 by sensor 32 or the detection of tape leader 11 by sensor 32a, respectively, and the resulting operation of automatic shut-off mechanism 36 serves to halt the rapid rotation of takeup reel 13 or of supply reel 14, respectively, by which the fast-forward and rewind operations are achieved.

Although the tape leaders 11 and 12 have been specifically described above as employed for connecting the ends of magnetic recording tape 10 to reels 13 and 14 so as to permit detection of the respective ends of the magnetic recording tape, it is to be understood that tape leaders according to this invention may be provided between successive portions of the magnetic recording tape on which respective information signals are recorded. In that case, the tape leaders may be detected or sensed for indicating the position of the magnetic recording tape or for achieving a temporary halt or pause in the transport of the tape at the intervals between the successive recorded information signals.

Further, although the tape leaders 11 and 12 have been specifically described as being associated with a magnetic recording tape, it is to be understood that the tape leaders according to this invention may be similarly employed with other types of recording tapes. Finally, it will be appreciated that the tape leaders according to this invention may be employed with a recording tape which is to be used in a so-called open-reel apparatus, as well as in a cassette-type apparatus, as specifically described above.

Having described a specific embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A tape leader secured at one end to an end of a recording tape, the tape leader comprising:
   two coextensive flexible layers of synthetic resin having substantially the same thickness, flexibility, resistance to moisture, resistance to crumpling, and properties of stretch, and a layer of metal material laminated therebetween.

2. A tape leader according to claim 1 in which said metal layer is electrically conductive.

3. A tape leader according to claim 1 in which each of said flexible synthetic resin layers is formed of a material selected from the group consisting of polyester, polyamide, polyimide and acetate resins.

4. A tape leader according to claim 1 in which each of said flexible synthetic resin layers is bonded to the adjacent surface of said metal layer by a thermosetting epoxy resin.

5. A tape leader according to claim 1, wherein said metal layer is detectable electronically to distinguish between said recording tape and said tape leader.

* * * * *